United States Patent Office 3,537,314
Patented Nov. 3, 1970

3,537,314
METHOD AND APPARATUS FOR MEASURING TRUE OR ACTUAL TEMPERATURE OF BODIES BY RADIANT ENERGY
Dary Yakovlevich Svet, Ulitsa Fersmana 3, kv. 17, Moscow, U.S.S.R.
Filed Mar. 31, 1967, Ser. No. 627,366
Claims priority, application U.S.S.R., Apr. 9, 1966, 1,069,259
Int. Cl. G01j 5/30, 5/60
U.S. Cl. 73—355                                6 Claims

ABSTRACT OF THE DISCLOSURE

A method and apparatus for measuring emissivity, transmission and the true temperature of bodies by radiant energy comprises obtaining signals corresponding to the intensities of at least two fluxes of different spectral composition from a radiating body and producing a resultant signal which indicates emissivity and transmission and is independent of the temperature of the radiant body. The signal may be employed as a correction in determining the true temperature of the body by radiation.

---

Figure 1:
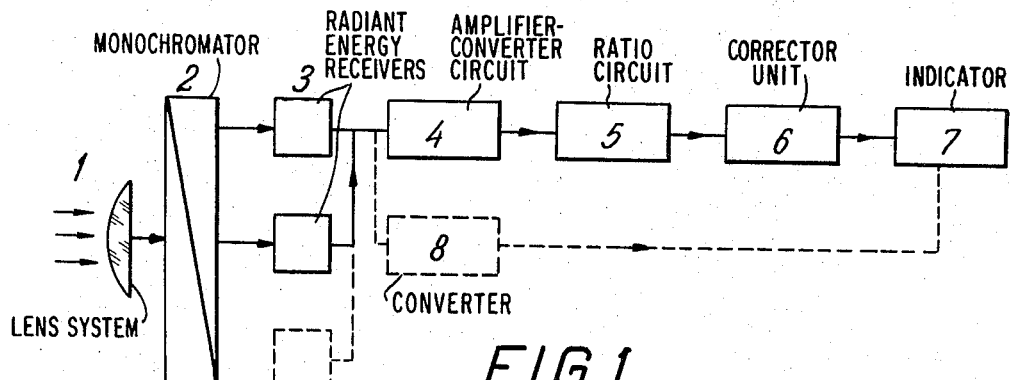

The present invention relates to methods and apparatus for measuring emissivity of a radiating body and transmission of an intermediate medium by measuring parameters of thermal radiation fluxes, and more particularly to methods and apparatus for measuring true or actual temperature of bodies by thermal radiation fluxes.

Known in the art are methods and apparatus in which emissivity coefficients and true temperature are determined by thermal radiation fluxes. Thus in a paper published by the applicant in "Transactions of the Academy of Sciences of the U.S.S.R.," 1959, vol. 126, p. 6, and in the U.S.S.R. Author's Certificate No. 117,752, 1958, methods are described for measuring the reflection factors and for measuring the true temperature by making use of both intrinsic radiation fluxes and reflected radiation fluxes obtained from an additional radiation source.

Disadvantages of these methods are their complexity and impossibility of measurements at great distances, particularly when the radiant object, whose temperature is to be measured, is inaccessible.

Accordingly, an object of the present invention is to provide a method and apparatus free of the above-listed disadvantages, which afford control of emissivity and measurement of true temperature by intrinsic thermal radiation fluxes from the objects, including those which are inaccessible, with emissivity coefficients varying during the process of measurement.

Another object of the present invention is to provide an apparatus and method ensuring transmission control and true temperature measurement in cases when the radiation fluxes being measured pass through a medium with a variable transmission coefficient.

One more object of the present invention is to provide an apparatus for measuring true temperature, which features high accuracy and stability and is essentially simple and reliable in design.

With these and other objects in view, a method of the present invention resides in that signals, corresponding to the radiant intensities of fluxes, are obtained, each of these signals is raised to a power proportional to the effective value of the wavelength of the respective selected radiation flux, the relation of said powered signals is determined for obtaining a certain resultant signal characteristic of parameters independent of the body temperature, including coefficients of transmission and emissivity, which allows the resultant signal to be used for a correction in determining the actual temperature of a body.

$$\lambda \text{ eff}' = C_2(T_2^{-1} - T_1^{-1}) \ln \frac{\lambda' \int_{\lambda'}^{\lambda''} b(\lambda, T_2) d\lambda}{\lambda' \int_{\lambda'}^{\lambda''} b(\lambda, T_1) d\lambda}$$

Effective wavelength principles are widely used in radiation pyrometry, allowing quasimonochromatic fluxes to be treated like monochromatic fluxes.

The effective value of wavelength is defined as follows

At any final spectral interval, the thermal radiation flux is defined by a definite spectral composition, because due to incoherence it is quasimonochromatic. More than fifty years ago, P. Foote (Bur. of Stand. Bull., 1915) suggested that such quasimonochromatic thermal radiation fluxes be described by effective wavelengths, for which the following applies for spectral intervals from $\lambda'$ to $\lambda$ within a temperature range from $T_1$ to $T_2$:

Signals, corresponding to the intensities of fluxes of different spectral compositions, can be obtained by measuring fluxes from a radiating surface and from an additional source of reference radiation.

An apparatus for measuring true or actual temperature, according to the method of the present invention, comprising a radiant energy receiver connected through an amplifier-converter circuit with a secondary instrument can be constructed in such a way that at the output of the receiver which picks up at least two radiation fluxes of different spectral composition for shaping signals, corresponding to the intensitities of said fluxes, series-connected across the secondary instrument are: a function generator adapted to raise each of the signals taken from the receiver to a power proportional to the effective value of the wavelength of the corresponding selected radiation flux; a ratio circuit determining the relation of said signals for obtaining a certain resultant signal; a corrector unit converting the resultant signal into a correction signal for obtaining the true temperature of the body.

The herein proposed apparatus can also be embodied in such a way that the radiant energy receiver be adapted to pick up more than two fluxes of different spectral composition, and the ratio circuit have a multiplier at its input providing a signal at the corrector unit output, proportional to the product of intensities, whose effective wavelengths are such that the sums of frequencies which are factors in the numerator and denominator are equal. In the apparatus of the present invention, to the output of the radiant energy receiver a logarithmic circuit can also be connected, whose output signals are fed to a subtraction circuit with a commutator.

With the purpose of increasing stability and accuracy of operation, in the apparatus of the present invention, a built-in source of reference radiation and a radiation chopper can be placed ahead of the receiver, said radiation chopper being synchronized with the commutator connected to the output of the amplifier-converter circuit and sending said resultant signal to the corrector unit alternately from the radiating surface and from the built-in source of reference radiation.

The invention will become more clear from a consideration of exemplary embodiments thereof, to be had in conjunction with the accompanying drawings, wherein:

FIGS. 1, 2, 3, 4, and 5 show different design versions, according to the present invention.

Now referring to FIG. 1, the apparatus comprises placed in series: an optical system 1 receiving radiation from a radiant body (not shown in the drawing); a monochromator arrangement 2 (light filters, a prism, a diffraction grating and the like) which selects radiation fluxes of the required spectral composition; radiant energy receivers 3 consisting of one or more elements (photoelectric, thermoelectric, bolometer and so on) which convert the radiation fluxes of appropriate spectral composition into electrical signals; an amplifier-converter circuit 4 adapted to raise the radiant energy receiver output signals to powers proportional to the effective values of the wavelengths; a ratio circuit 5 at whose output a resultant signal is obtained, determined by the relation of the intensity signals obtained at the output of circuit 4; when the signals corresponding to different spectral radiancies C of the radiation receiver 3 are taken off at time intervals, the operation of the system, including its components 4 and 5, must be synchronized in time; a corrector unit 6 which converts the values of the resultant "ratio" signal, obtained at the output of circuit 5, into signals having values which determine the corresponding correction values for the true temperature, the conversion being made by preliminary calibration of corrector unit 6; a secondary instrument 7 indicating (recording either the correction value for the true temperature or the true temperature proper. A converter 8 which converts signals of intensities corresponding to the fluxes of different spectral compositions into signals of conventional temperature (color, brightness, partial or total radiation temperature).

If the apparatus under consideration is used only for measuring the emissivity of a radiating object and transmission of an intermediate medium, whereas the measurement of true temperature is not required, corrector unit 6 and converter 8 can be excluded from the circuit shown in FIG. 1. In this case the intensity relation signal from the output of the ratio circuit can be fed directly to secondary instrument 7 which is here an immediate indicator of emissivity and transmission.

The principle of operation of the apparatus can be explained as follows.

Let us denote the radiance (brightness) values for two spectral regions having wavelength effective values $\lambda_1$ and $\lambda_2$ and selected from the radiation flux by monochromator arrangement 2 as $b(\lambda_1, T)$ and $b(\lambda_2, T)$, where T is the value of true temperature of a radiant body; the emissivity coefficients of the latter as $\epsilon(\lambda_1)$ and $\epsilon(\lambda_2)$ and the intermediate medium transmission coefficients as $\tau(\lambda_1)$ and $\tau(\lambda_2)$, respectively. Then the expression of radiancies can be written in the following form:

$$B(\lambda_1, T) = b_0(\lambda_1, T)\epsilon(\lambda_1)\tau(\lambda_1)$$
$$B(\lambda_2, T) = b_0(\lambda_2, T)\epsilon(\lambda_2)\tau(\lambda_2)$$

where $b_0(\lambda_1, T)$ and $b_0(\lambda_2, T)$ are respective radiancies of the black body which is under the temperature conditions of the radiant body, for the same wavelengths.

Let us denote spectrum sensitivity coefficients of radiation receiver 3 as $\epsilon_1$ and $\epsilon_2$. Correspondingly, for the wavelengths $\lambda_1$ and $\lambda_2$ the signals $x_i$ at the input of circuit 4 within the Wien approximation can be written as follows:

$$x_1 = \epsilon_1 C_1 \lambda_1^{-5} \epsilon(\lambda_1) \tau(\lambda_1) \exp. -\frac{C_2}{\lambda_1 T}$$

$$x_2 = \epsilon_2 C_1 \lambda_2^{-5} \epsilon(\lambda_1) \tau(\lambda_1) \exp. -\frac{C_2}{\lambda_2 T}$$

Here, $C_1 = 3.732 \cdot 10^{-5}$ erg. cm.$^2$·sec.$^{-1}$, $C_2 = 1.4380 \mu$·degree.

The relation between the signals $Y_i$ at the output of amplifier-converter circuit 4 and the signals $x_i$ at the input is:

$$Y_i = K x_i^{\lambda_i}$$

Hence the signals at the input of ratio circuit 5 will be:

$$Y_1 = K \epsilon_1^{\lambda_1} C_1^{\lambda_1} \epsilon^{\lambda_1}(\lambda_1) \tau^{\lambda_1}(\lambda_1) \lambda_1^{-5\lambda_1} \exp. -\frac{C_2}{T}$$

$$Y_2 = K \epsilon_2^{\lambda_2} C_1^{\lambda_2} \epsilon^{\lambda_2}(\lambda_2) \tau^{\lambda_2}(\lambda_2) \lambda_2^{-5\lambda_2} \exp. -\frac{C_2}{T}$$

The resultant output signal of circuit 5 will be obtained in the form of the relationship $$Z_{1,2} = \frac{Y_1}{Y_2}$$

$$Z_{1,2} = \frac{\epsilon_1^{\lambda_1} \lambda_1^{-5\lambda_1} C_1^{(\lambda_1 \lambda_2)}}{\epsilon_2^{\lambda_2} \cdot \lambda_2^{-5\lambda_2}} \cdot \frac{\epsilon^{\lambda_1}(\lambda_1) \tau^{\lambda_1}(\lambda_1)}{\epsilon^{\lambda_2}(\lambda_2) \tau^{\lambda_2}(\lambda_2)}$$

$$= A_{1,2} \cdot \frac{\epsilon^{\lambda_1}(\lambda_1) \tau^{\lambda_1}(\lambda_1)}{\epsilon^{\lambda_2}(\lambda_2) \tau^{\lambda_2}(\lambda_2)}$$

$$A_{1,2} = \frac{\epsilon_1^{\lambda_1} \lambda_1^{-5\lambda_1} C_1^{(\lambda_1 - \lambda_2)}}{\epsilon_2^{\lambda_2} \cdot \lambda_2^{-5\lambda_2}} = \text{const.}$$

Thus, the resultant signals $Z_{1,2}$, with the parameters $\epsilon_1$ and $\epsilon_2$ of the apparatus being constant, is determined by the emissivity of the radiating object and the transmission of the intermediate medium and does not depend on the radiant body temperature when the Wien law is correct.

Having obtained by preliminary calibration the values of temperature correction $\Delta T$ corresponding to certain values of the signals $Z_{1,2}$ for a particular temperature or range thereof, a signal $Q \equiv \Delta T$ will be obtained at the output of corrector unit 6. By sending both or one of the intensity signals $x_i$ simultaneously to converter 8, a signal N will be obtained at the output of the latter, characteristic of temperature value (brightness, partial or colour temperature), i.e. $N \equiv T_x$. The algebraic sum of the values $T_x + \Delta T = T$, where T is the value of the true temperature of the object.

Thus secondary instrument 7 which simultaneously receives signals Q and N will indicate (record) the values of the true temperature of the radiating object.

It is obvious that, when no necessity arises in measuring the true temperature, the condition, such as invariability of the emissivity of the radiant body as well transmission of an intermediate medium, can be determined by the values of signal $Z_{1,2}$.

Figure 2:
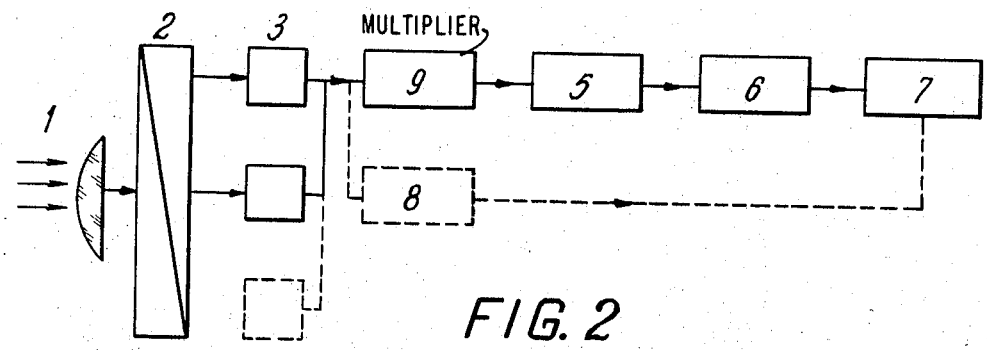

FIG. 2 shows another design version of the apparatus. Here elements 1, 2, 3, 5, 6, 7 and 8 are similar to those of the apparatus shown in FIG. 1. From the output of radiant energy receiver 3, the signals corresponding to three and more fluxes of the appropriate spectral compositions are fed to multiplier 9, from which the multiplied signals are fed to ratio circuit 5 shaping a resultant "ratio" signal in which the sum of the frequencies that are factors in the numerator equals the sum of the frequencies that are factors in the denominator.

From the output of circuit 5 the resultant signal is fed to corrector unit 6, and the further circuit arrangement does not differ from that shown in FIG. 1.

In case only emissivity and transmission are measured and there is no need in measuring the true temperature, elements 6 and 8 can be excluded from the circuit of FIG. 2 as they were excluded from that of the apparatus shown in FIG. 1.

In the circuit of FIG. 2 the radiance values $/b(\lambda_i, T)/$ corresponding to three or more, for example, four radiation fluxes with the effective wavelengths $\lambda_1, \lambda_2, \lambda_3$ and $\lambda_4$ $$B(\lambda_1, T) = \epsilon(\lambda_1, T)\gamma(\lambda_1, T)B_0(\lambda_1, T)$$
$$B(\lambda_2, T) = \epsilon(\lambda_2, T)\gamma(\lambda_2, T)B_0(\lambda_2, T)$$
$$B(\lambda_3, T) = \epsilon(\lambda_3, T)\gamma(\lambda_3, T)B_0(\lambda_3, T)$$
$$B(\lambda_4, T) = \epsilon(\lambda_4, T)\gamma(\lambda_4, T)B_0(\lambda_4, T)$$

produce at the output of radiant energy receiver 3 signals $$X_1 = \epsilon_1 C_1 \lambda_1^{-5} \epsilon(\lambda_1, T) \tau(\lambda_1, T) \exp. -\frac{C_2}{\lambda_1 T}$$

$$X_2 = \epsilon_2 C_1 \lambda_2^{-5} \epsilon(\lambda_2, T) \tau(\lambda_2, T) \exp. -\frac{C_2}{\lambda_2 T}$$

$$X_3 = \epsilon_3 C_1 \lambda_3^{-5} \epsilon(\lambda_3, T) \tau(\lambda_3, T) \exp. -\frac{C_2}{\lambda_3 T}$$

$$X_4 = \epsilon_4 C_1 \lambda_4^{-5} \epsilon(\lambda_4, T) \tau(\lambda_4, T) \exp. -\frac{C_2}{\lambda_4 T}$$

The relation between the wavelengths of these spectral radiances is such that $$\lambda_1^{-1}+\lambda_2^{-1}=\lambda_3^{-1}+\lambda_4^{-1}=\lambda_0^{-1}$$

then by applying signals in pair to multiplier 9, at the output of the latter two signals $P_{1,2}$ and $P_{3,4}$ will be obtained $$P_{1,2}=BX_1X_2$$
$$=B\epsilon_1\epsilon_2 C_1^2\lambda_1^{-5}\lambda_2^{-5}\epsilon(\lambda_1,T)\epsilon(\lambda_2,T)\tau(\lambda_1,T)\tau(\lambda_2,T)\ \exp.\frac{C_2}{\lambda_0 T}$$

$$P_{3,4}=BX_3X_4$$
$$=B\epsilon_3\epsilon_4 C_1^2\lambda_3^{-5}\lambda_4^{-5}\epsilon(\lambda_3,T)\epsilon(\lambda_4,T)\tau(\lambda_3,T)\tau(\lambda_4,T)\ \text{esp.}\frac{C_3}{\lambda_0 T}$$

where B=const.

By feeding signals $P_{1,2}$ and $P_{3,4}$ from the output of multiplier 9 to ratio circuit 5 a resultant signal $Z_{1-4}$ will be produced at the output thereof, the value of which does not depend on the temperature of the radiating body. Indeed, $$Z_{1-4}=\frac{P_{1,2}}{P_{3,4}}=\frac{\epsilon_1\epsilon_2\lambda_3^5\lambda_4^5}{\epsilon_3\epsilon_4\lambda_1^5\lambda_2^5}\cdot\frac{\epsilon(\lambda_1,T)\epsilon(\lambda_2,T)\tau(\lambda_1,T)\tau(\lambda_2,T)}{\epsilon(\lambda_3,T)\epsilon(\lambda_4,T)\tau(\lambda_3,T)\tau(\lambda_4,T)}$$

Signal $Z_{1-4}$, with invariable parameters $\epsilon_1$, $\epsilon_2$, $\epsilon_3$, $\epsilon_4$ does not depend similarly to the case of the apparatus of FIG. 1, on the radiating body temperature and is determined by the emissivity of the radiating body temperature and is determined by the emissivity of the radiating body and by the transmission of the intermediate medium. Similarly to the apparatus of FIG. 1, the preliminary calibration makes it possible to obtain a signal at the output of corrector unit 6 determining the value $\Delta T$, and at the output of corrector unit 8 to obtain a signal determining the conventional temperature value.

Similar results can also be obtained for three wavelength values, for example providing; $\lambda_1^{-1}+\lambda_2^{-1}=\lambda_3^{-1}$ and so on.

In conformity with another embodiment of the present invention (FIG. 3), the intensity signals taken from radiant energy receiver 3 are fed to logarithmic unit 10 and log signals are applied to circuit 4 which raises the intensity signals to appropriate powers. Since at the output of unit 10 the logarithms of the signals are obtained the involution is elementary through multiplying by a factor corresponding to the required value of the power. Multiplier 9 (FIG. 3) functions both as a multiplier and a ratiometer. If the log signals fed thereto are in phase, it effects their multiplication. In case the signals applied to multiplier 9 input are in phase opposition, it produces the output in the form of relation of these signals.

Corrector unit 6 and secondary instrument 7 are identical in design and function with those of FIGS. 1 and 2.

Figure 3:
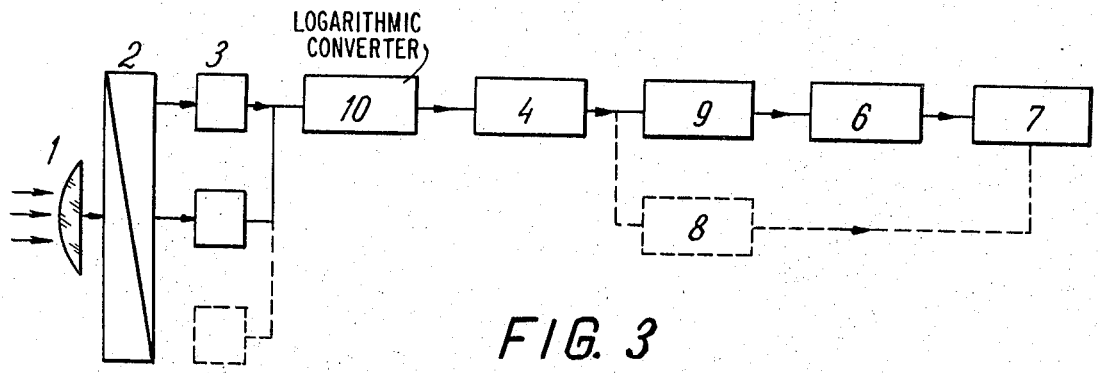

In the circuit of FIG. 3, the logarithms of the intensity signals and not the intensity signals proper are converted by converter 8 into a signal determining the conventional temperature, which is often more effective.

Similarly to the circuits of FIGS. 1 and 2, is case it is necessary to determine the emissivity and transmission only, elements 6 and 8 can be omitted (FIG. 3).

In the circuit of FIG. 3, the signals of the radiation intensity at the output of receiver 3 are converted into logarithms by arrangement 10 after which they will be in the form $l_i=\ln x$, at the output of circuit 4 the signals will be in the form $z_i=\lambda_i l_i=\lambda_i\ \ln\ x$ if no more than two spectral emissivities are employed.

When three and more spectral emissivities are selected, with the above mentioned frequency relation, used as circuit 4 is a conventional quadripole or two-terminal network whose output signal will be in the form $$z_i=kl_i=k\ ln\ x$$

where $$\frac{aK}{a\lambda}=0$$

When no more than two radiation fluxes are selected with wavelengths $\lambda_1$ and $\lambda_2$ the signals from the output of circuit 4 $Z_1=\lambda_1\ \ln\ x_1$ and $Z=\lambda_2\ \ln\ x_2$ are fed to multiplier 9 in phase opposition.

Then at the output of multplier 9 a resultant signal $z_{1,2}=z_1-z_2$ is obtained in the form of the logarithm of the relation $$Z'_{1,2}=\ln\frac{X_1^{\lambda_1}}{X_2^{\lambda_2}}$$

By the value of the signal $z_{1,2}^1$ in the way similar to the abovedescribed (by means of preliminary calibration), the signal $Q\equiv\Delta T$ is obtained at the output of corrector unit 6.

It is obvious, that in the circuit of FIG. 3, the signals at the output of converter 8, due to the preliminary taking of their logarithms by arrangement 10, will be proportional to the inverse values of temperature (color or brightness temperature), which is convenient for use.

When the circuit (FIG. 3) is used for three and more spectral radiancies, involution of $\lambda_i$ need not be made, as it was unnecessary with the circuit shown in FIG. 2. Thus with $\lambda_1^{-1}+\lambda_2^{-1}=\lambda_3^{-1}$ the resultant signal at the output of multiplier 9 can be in the form $$Z_{1-3}=\ln\frac{KC_1\lambda_1}{+\lambda_3^{-5}}{}_{-5}\lambda_2^{-5}+\ln\frac{\epsilon(\lambda_1,T)\epsilon(\lambda_2,T)\tau(\lambda_1,T)\tau(\lambda_2,T)}{\epsilon(\lambda_3,T)\tau(\lambda_3,T)}$$

with $\lambda_1^{-1}+\lambda_2^{-1}=\lambda_3^{-1}+\lambda_4^{-1}$ $$Z_{1-4}=\ln\frac{\lambda_3^5\lambda_4^5}{\lambda_1^5\lambda_2^5}+\ln\frac{\epsilon(\lambda_1,T)\epsilon(\lambda_2,T)\tau(\lambda_1,T)\tau(\lambda_2,T)}{\epsilon(\lambda_3,T)\epsilon(\lambda_4,T)\tau(\lambda_3,T)\tau(\lambda_4,T)}$$

and so on.

Figure 4:
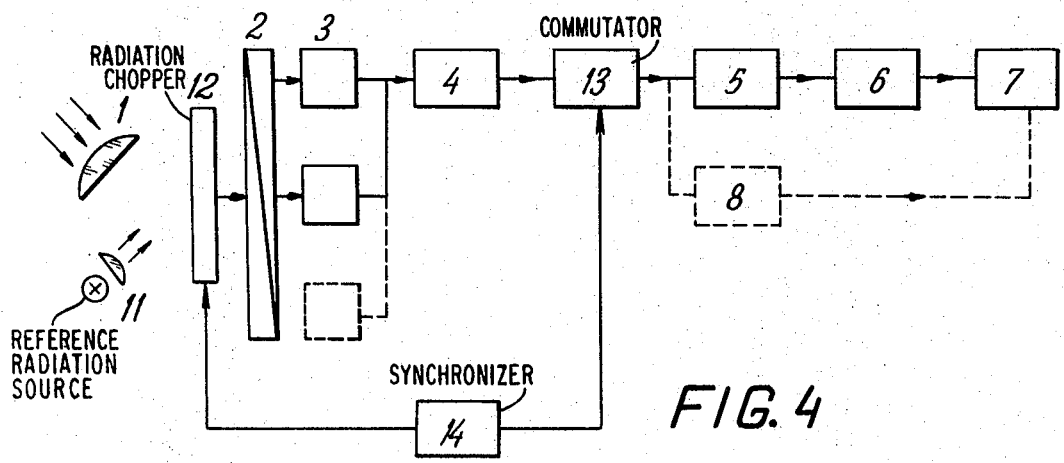

One more embodiment of the present invention is shown in FIG. 4.

Here, the radiation fluxes fall on monochromator arrangement 2 and radiant energy receivers 3 with the aid of radiation chopper 12 alternately from the radiant body being controlled via optical system 1 and from built in reference radiation source 11. The fluxes from both sources are fed to radiation receivers 3 which produce the intensity signals fed to amplifier-converter circuit 4.

From the output of circuit 4 the intensity signals from both radiation sources raised to the required powers are applied to commutator 13 which is operatively associated through the intermediary of synchronizer 14 to radiation chopper 12. From the output of commutator 13 the intensity signals from both radiation sources, raised to the required powers are fed in appropriate phases to ratio circuit 5. The functions of components 6, 7 and 8 are similar to those of the components in the abovedescribed circuits of FIGS. 1, 2 and 3. Corrector unit 6 and converter 8 can be omitted if there is no need in measuring the actual temperature.

The advantage of the circuit of FIG. 4 over the foregoing ones is its high stability due to elimination of adverse effects of transmission factors of some elements, including spectral sensitivity values of radiant energy receivers 3.

Here with the aid of radiation chopper 12 radiation via monochromator arrangement 2 falls on receiver 3, alternately from the radiant body being controlled and from built-in reference radiation source 11.

In the first case receiver 3 produces signals, for spectral regions with effective wavelengths $\lambda_1, \lambda_2, \ldots \lambda_i$ $$X_1 = \xi_1 C_1 \lambda_1^{-5} \epsilon(\lambda_1) \tau(\lambda_1) \exp. -\frac{C_2}{\lambda_1 T}$$

$$X_2 = \xi_2 C_1 \lambda_2^{-5} \epsilon(\lambda_2) \tau(\lambda_2) \exp. -\frac{C_2}{\lambda_2 T}$$

$$\cdots\cdots$$

$$X_i = \xi_i C_1 \lambda_i^{-5} \epsilon(\lambda_i) \tau(\lambda_i) \exp. -\frac{C_2}{\lambda_i T}$$

In the second case receiver 3 receives radiation fluxes from built-in source 11 whose emissivity coefficients are $\epsilon'(\lambda_1), \epsilon'(\lambda_2) \ldots \epsilon'(\lambda_i)$ and which has the temperature value $T^1$.

In this case the signals of the radiation intensities will be $$X_1' = \xi_1 C_1 \lambda_1^{-5} \epsilon'(\lambda_1) \exp. -\frac{C_2}{\lambda_1 T'}$$

$$X_2' = \xi_2 C_1 \lambda_2^{-5} \epsilon'(\lambda_2) \exp. -\frac{C_2}{\lambda_2 T'}$$

$$\cdots\cdots$$

$$X_i' = \xi_i C_1 \lambda_i^{-5} \epsilon'(\lambda_i) \exp. -\frac{C_2}{\lambda_i T'}$$

Correspondingly, at the output of circuit 4, the signals from the radiating body being controlled will be in the form $Y_i = K x_i^{\lambda_i}$ that is $$Y_1 = K \xi_1^{\lambda_1} C_1^{\lambda_1} \lambda_1^{-5\lambda_1} \epsilon^{\lambda_1}(\lambda_1) \tau^{\lambda_1}(\lambda_1) \exp. -\frac{C_2}{T}$$

$$Y_2 = K \xi_2^{\lambda_2} C_1^{\lambda_2} \lambda_2^{-5\lambda_2} \epsilon^{\lambda_2}(\lambda_2) \tau^{\lambda_2}(\lambda_2) \exp. -\frac{C_2}{T}$$

and so on.

The signals from built-in source 11 at the output of circuit 4 will, correspondingly, be:

$$y_1' = K \xi_1^{\lambda_1} C_1^{\lambda_1} \lambda_1^{-5\lambda_1} \epsilon'^{\lambda_1}(\lambda_1) \exp. -\frac{C_2}{T}$$

$$y_2' = K \xi_2^{\lambda_2} C_1^{\lambda_2} \lambda_2^{-5\lambda_2} \epsilon'^{\lambda_2}(\lambda_2) \exp. -\frac{C_2}{T}$$

and so on.

By means of commutator 13 controlled by synchronizer 14 the signals $Y_1, Y_2 \ldots Y_i$ and $Y'_1, Y'_2 \ldots Y'_i$ are fed to ratio circuit 5 so that the resultant signal $Z_{1-i}$ at the output thereof will be of the form $$Z = \frac{y_1 y_2 \ldots y_{i-1} y_i'}{y_2 y_1' \ldots y_i y_{i-1}'}$$

Thus, for example, for two spectral radiancies with the effective wavelengths $\lambda_1$ and $\lambda_2$ $$Z_{1,2}' = \frac{\epsilon^{\lambda_1}(\lambda_1) \tau^{\lambda_1}(\lambda_1) \epsilon'^{\lambda_2}(\lambda_2)}{\epsilon^{\lambda_3}(\lambda_3) \tau^{\lambda_3}(\lambda_3) \epsilon'^{\lambda_3}(\lambda_3)}$$

while for the built-in source $$\frac{\epsilon'^{\lambda_2}(\lambda_2)}{\epsilon'^{\lambda_1}(\lambda_1)} = \text{const.}$$

and hence the signal $Z'_{1-2}$ is characteristic, regardless of the stability of circuit components, of the radiation flux parameters (emissivity and intermediate medium transmission).

When the radiation fluxes for more than two spectral intervals are used, for example for three $(\lambda_1^{-1} + \lambda_2^{-1} = \lambda_3^{-1})$ the abovementioned resultant signal at the output of ratio circuit 5 (FIG. 4) can be of the form $$Z_{1-3} = \frac{\epsilon(\lambda_1)\epsilon(\lambda_2)\tau(\lambda_1)\tau(\lambda_2)\epsilon'(\lambda_3)}{\epsilon(\lambda_3)\tau(\lambda_3)\epsilon'(\lambda_1)\epsilon'(\lambda_2)}$$

and so on.

Further operation of the circuit shown in FIG. 4 is not different from those described above.

Figure 5:
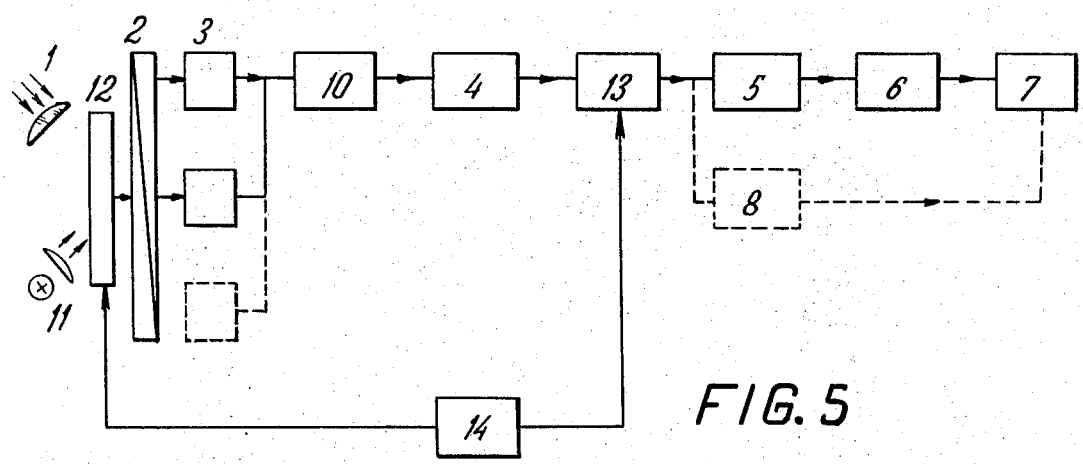

Shown in FIG. 5 is another modification of the apparatus.

Monochromator arrangement 2 via radiation chopper 12 receives radiation fluxes alternately from the radiating body through optical system 1 and from built-in reference radiation source 11. From the output of radiant energy receivers 3 the intensity signals are fed to logarithmic arrangement 10 the output of which is connected to amplifier converter circuit 4 adapted to raise the obtained signals to the required powers.

The logarithms of the intensity signals thus transformed are applied to the input of commutator 13 which is operatively associated through the intermediary of synchronizer 14 to radiation chopper 12.

From commutator 13 the transformed intensity signals from the radiating body under determination and built-in reference radiation source 11 are fed in appropriate phases to ratio circuit 5.

Said resultant signal from the output of circuit 5 is fed to corrector unit 6.

Elements 6, 7, and 8 of the apparatus shown in FIG. 5 function in much the same manner as those of FIG. 4.

The circuit of FIG. 5 combines the merits of the circuits illustrated in FIGS. 3 and 4.

Here the said resultant signal at the output of ratio circuit 5 will be in the logarithmic form. Thus, for example, for two spectral components with the wavelengths $\lambda_1$ and $\lambda_2$ $$Z_{1,2} = \ln \frac{\epsilon^{\lambda_1}(\lambda_1) \tau^{\lambda_1}(\lambda_1) \epsilon'^{\lambda_2}(\lambda_2)}{\epsilon^{\lambda_2}(\lambda_2) \tau^{\lambda_2}(\lambda_2) \epsilon'^{\lambda_1}(\lambda_1)}$$

and so on.

The apparatus of FIG. 5 is also advantageous in that the signals of conventional temperature, for example color temperature, are obtained in the logarithmic form.

The latter design version of the apparatus has turned out to be exceedingly effective.

What is claimed is:

1. A method of measuring emissivity, and transmission of bodies by radiant energy comprising: selecting two fluxes of different spectral compositions from a radiant body; obtaining signals corresponding to the intensities of these fluxes; raising each of said signal to a power proportional to the effective value of the wavelength of the respective selected radiation fluxes; and determining the ratio of said signals to obtain a resultant signal which depends on the emissivity and transmission capacity and does not depend on the temperature.

2. A method as claimed in claim 1 wherein more than two fluxes are selected from the radiant body and said resultant signal is obtained from the ratio of products of the signals corresponding to the intensities of fluxes of different spectral compositions, and selecting the values of effective wavelength of said signals such that the sum of the frequencies corresponding to the values of effective wavelengths of spectral components that are factors in the numerator equals the sum of the frequencies corresponding to the values of effective wavelengths of spectral components that are factors in the denominator.

3. An apparatus for measuring emissivitl, transmission and true or actual temperature of bodies by radiant energy, which comprises a plurality of radiant energy receivers picking up two radiation fluxes of different spectral compositions from a radiant body for producing signals corresponding to the intensities of said fluxes; and in series circuit therewith amplifier means connected to said receivers to raise each of the signals from said receivers to a power proportional to the effective wavelength value of the respective selected radiation flux; a ratio means for determining the ratio of said signals for obtaining a resultant signal; a calibration corrector for converting the resultant signal into a temperature correcion signal; instrument indicator means for producing an uncorrected temperature signal from at least one of said fluxes, and means connecting the corrector to the indicator means for algebraic addition of the uncorrected temperature signal and the temperature correction signal to obtain a signal representing the actual temperature of the radiant body.

4. An apparatus as claimed in claim 3, wherein said radiant energy receivers are adapted to pick up more than two fluxes of different spectral composition, and the ratio means is connected to give the ratio of the product of certain of said flux signals to the product of others of said flux signals, the fluxes being selected such that the sum of the frequencies corresponding to the effective wavelengths of the factors in the numerator is equal to the sum of the frequencies corresponding to the effective wavelengths of the factors in the denominator.

5. An apparatus as claimed in claim 3, comprising a logarithmic circuit connected at the output of said radiant energy receivers, which produces intensity signals which are fed to a subtraction circuit, said subtraction circuit comprising a commutator which receives said intensity signals after they have passed through the logarithmic circuit and transmits them in opposite phases relative to one another, thereby subtracting the signals.

6. An apparatus as claimed in claim 3, comprising a built-in source of reference radiation and a radiation chopper in front of said receivers, said radiation chopper being synchronized with a commutator connected at the output of said amplifier means alternately from the radiating surface and from the built-in reference radiation source.

References Cited

UNITED STATES PATENTS

| | | |
|---|---|---|
| 2,517,554 | 8/1950 | Frommer. |
| 2,565,249 | 8/1951 | Machler _____ 73—355 |
| 2,648,253 | 8/1953 | Sweet. |
| 2,652,743 | 9/1953 | Marrow. |
| 2,800,023 | 7/1957 | Obermaier _____ 73—355 |
| 2,978,589 | 4/1961 | Howell _____ 73—355 |
| 3,137,170 | 6/1964 | Astheimer _____ 73—355 |
| 3,435,237 | 3/1969 | Collins _____ 73—355 XR |

FOREIGN PATENTS

| | | |
|---|---|---|
| 136,934 | 11/1961 | U.S.S.R. |

LOUIS R. PRINCE, Primary Examiner

F. SHOON, Assistant Examiner